United States Patent
Matsunaga

(10) Patent No.: US 10,298,862 B2
(45) Date of Patent: May 21, 2019

(54) IMAGING APPARATUS AND IMAGING METHOD

(71) Applicant: Olympus Corporation, Hachioji-shi, Tokyo (JP)

(72) Inventor: Takuya Matsunaga, Akiruno (JP)

(73) Assignee: Olympus Corporation, Tokyo (JP)

( * ) Notice: Subject to any disclaimer, the term of this patent is extended or adjusted under 35 U.S.C. 154(b) by 9 days.

(21) Appl. No.: 15/614,843

(22) Filed: Jun. 6, 2017

(65) Prior Publication Data

US 2018/0007290 A1 Jan. 4, 2018

(30) Foreign Application Priority Data

Jul. 1, 2016 (JP) .................................. 2016-131556

(51) Int. Cl.
| | |
|---|---|
| *H04N 5/232* | (2006.01) |
| *G03B 13/00* | (2006.01) |
| *H04N 5/357* | (2011.01) |
| *G06T 3/40* | (2006.01) |
| *H04N 9/64* | (2006.01) |
| *H04N 5/208* | (2006.01) |
| *H04N 5/235* | (2006.01) |
| *H04N 5/374* | (2011.01) |
| *H04N 5/3745* | (2011.01) |

(52) U.S. Cl.
CPC ............... *H04N 5/357* (2013.01); *G06T 3/40* (2013.01); *H04N 5/208* (2013.01); *H04N 5/2356* (2013.01); *H04N 5/23212* (2013.01); *H04N 5/23293* (2013.01); *H04N 9/646* (2013.01); *H04N 5/374* (2013.01); *H04N 5/37452* (2013.01)

(58) Field of Classification Search
CPC .................................................. H04N 5/2356
USPC ........................................................ 348/346
See application file for complete search history.

(56) References Cited

U.S. PATENT DOCUMENTS

| | | | |
|---|---|---|---|
| 2006/0033831 A1 | 2/2006 | Ejima | |
| 2009/0109310 A1* | 4/2009 | Kobayashi | ............. H04N 5/142 348/302 |

(Continued)

FOREIGN PATENT DOCUMENTS

JP 2001-298755 10/2001

*Primary Examiner* — Anthony J Daniels
(74) *Attorney, Agent, or Firm* — John C. Pokotylo; Pokotylo Patent Services

(57) ABSTRACT

An imaging apparatus including: an image sensor for obtaining image data; a highlight signal generation circuit for generating a highlight signal from the image data; a highlight signal combining circuit for combining a plurality of the highlight signals to generate a combined highlight signal; a display image generation circuit for superimposing the combined highlight signal on the image data to generate display image data; and a controller for moving the focusing position to a different focus position, obtaining first image data and second image data, causing the highlight signal generation circuit to generate first and second highlight signals from these pieces of image data, causing the highlight signal combining circuit to combine the first and second highlight signals to generate a combined highlight signal, and causing the display image generation circuit to superimpose the combined highlight signal on the second image data to generate display image data.

12 Claims, 9 Drawing Sheets

(56) References Cited

U.S. PATENT DOCUMENTS

2015/0264202 A1* 9/2015 Pawlowski ........ H04N 1/00106
                                                    348/207.11
2017/0264773 A1* 9/2017 Okamoto ............... H04N 5/772

* cited by examiner

| | L1 | L2 | Lr | L3 | L4 |
|---|---|---|---|---|---|
| CLOSEST ─────┼────┼────┼────┼────┼──── ∞ | | | | | |
| PHOTOGRAPHING ORDER | | | | | |
| STILL IMAGE 1 | 4 | 2 | 1 | 3 | 5 |
| STILL IMAGE 2 | 1 | 2 | 3 | 4 | 5 |
| LV1 | 1 | 4 | 3 | 5 | 2 |
| LV2 | 1 | × | 3 | × | 2 |

IMAGING APPARATUS AND IMAGING METHOD

CROSS-REFERENCE TO RELATED APPLICATIONS

Benefit is claimed, under 35 U.S.C. § 119, to the filing date of prior Japanese Patent Application No. 2016-131556 filed on Jul. 1, 2016. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and an imaging method which obtain a plurality of pieces of image data while changing a focus position and combine the plurality of pieces of image data.

2. Description of the Related Art

It is difficult to take a photo focused at all the focus positions. Therefore, it is proposed to move a focus position after obtaining image data by taking a photo and take a photo again so as to obtain image data, and to obtain a plurality of pieces of image data by repeating this, and then, to combine the plurality of pieces of image data, thus providing image data focused for a wide range of a subject distance (for example, see Japanese Patent Laid-Open No. 2001-298755 (hereinafter, referred to as "Patent Literature 1")). Note that, this combining processing is referred to as focus stacking processing.

Moreover, highlight processing (also called "focus peaking processing" or "subject outline processing" for displaying a focused portion in a photographed image is known (for example, see Japanese Patent Laid-Open No. 2001-136429 (hereinafter, referred to as "Patent Literature 2")). This highlight processing is processing to make a portion with high contrast in an image easily viewable by highlighting a signal of a high frequency component relative to a signal of a low frequency component with respect to an image signal.

By applying the highlight processing also to a combined image generated by the focus stacking processing, a portion with high contrast in the image, that is, a focused portion can be easily checked. Particularly in live-view display, by checking the depth combined image to which the highlight processing is applied, a focusing range can be easily checked.

SUMMARY OF THE INVENTION

An imaging apparatus according to a first aspect of the present invention comprising: a focus position changing driver for moving a focusing position; an image sensor for capturing a subject image to obtain image data; a highlight signal generation circuit for generating a highlight signal from the obtained image data; a highlight signal combining circuit for combining a plurality of the highlight signals to generate a combined highlight signal; a display image generation circuit for superimposing the combined highlight signal on the image data to generate display image data; and a controller for giving instructions to cause the focus position changing driver to move the focusing position to a different focus position and the image sensor to obtain first image data and second image data, to cause the highlight signal generation circuit to generate a first highlight signal and a second highlight signal from the first image data and the second image data, to cause the highlight signal combining circuit to combine the first highlight signal and the second highlight signal to generate the combined highlight signal, and to cause the display image generation circuit to superimpose the combined highlight signal on the second image data to generate the display image data.

An imaging method according to a second aspect of the present invention is an imaging method in an imaging apparatus having an image sensor for capturing a subject image to obtain image data, comprising, moving a focusing position to a first focus position so as to obtain first image data by the image sensor, and moving the focusing position to the first focus position so as to obtain second image data by the image sensor; generating a first highlight signal by using the first image data, and generating a second highlight signal by using the second image data; combining the first highlight signal and the second highlight signal to generate a combined highlight signal; and superimposing the combined highlight signal on the second image data.

DETAILED DESCRIPTION OF THE PREFERRED EMBODIMENTS

Hereinafter, an example applied to a digital camera as an embodiment of the present invention will be described. This camera has an imaging section, converts a subject image to image data by this imaging section, and performs live-view display of the subject image on a display section arranged on a body on the basis of this converted image data. A photographer determines a composition or a shutter chance by observing the live-view display. In a release operation, image data is recorded in a recording medium. The image data recorded in the recording medium can be reproduced/displayed on the display section when a reproduction mode is selected.

Figure 4:
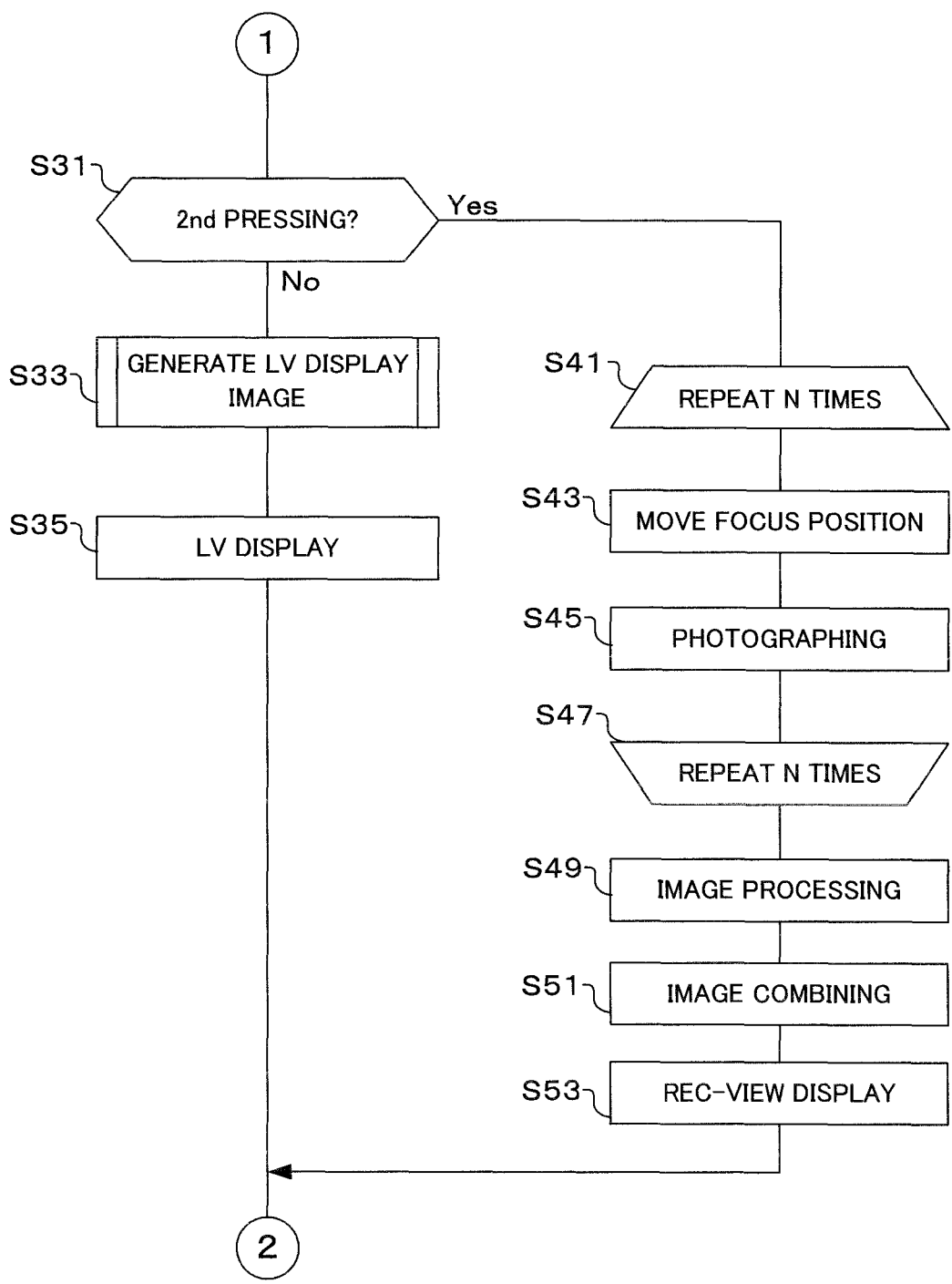
FIG. 4 is a flowchart illustrating the operation of focus stacking of the camera according to the embodiment of the present invention.
Figure 5:
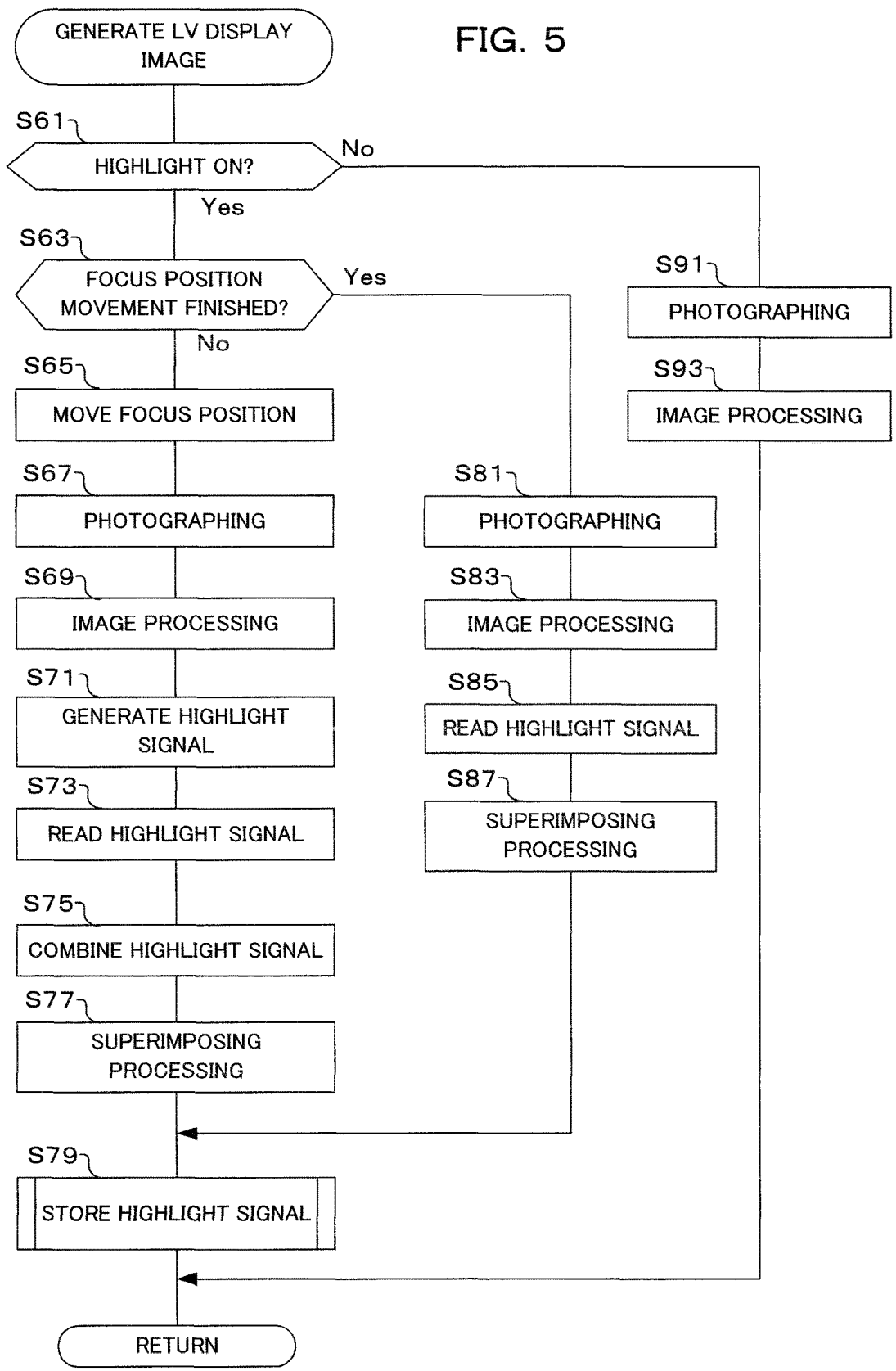
FIG. 5 is a flowchart illustrating an operation of LV display image generation of the camera according to the embodiment of the present invention.
Figure 9:
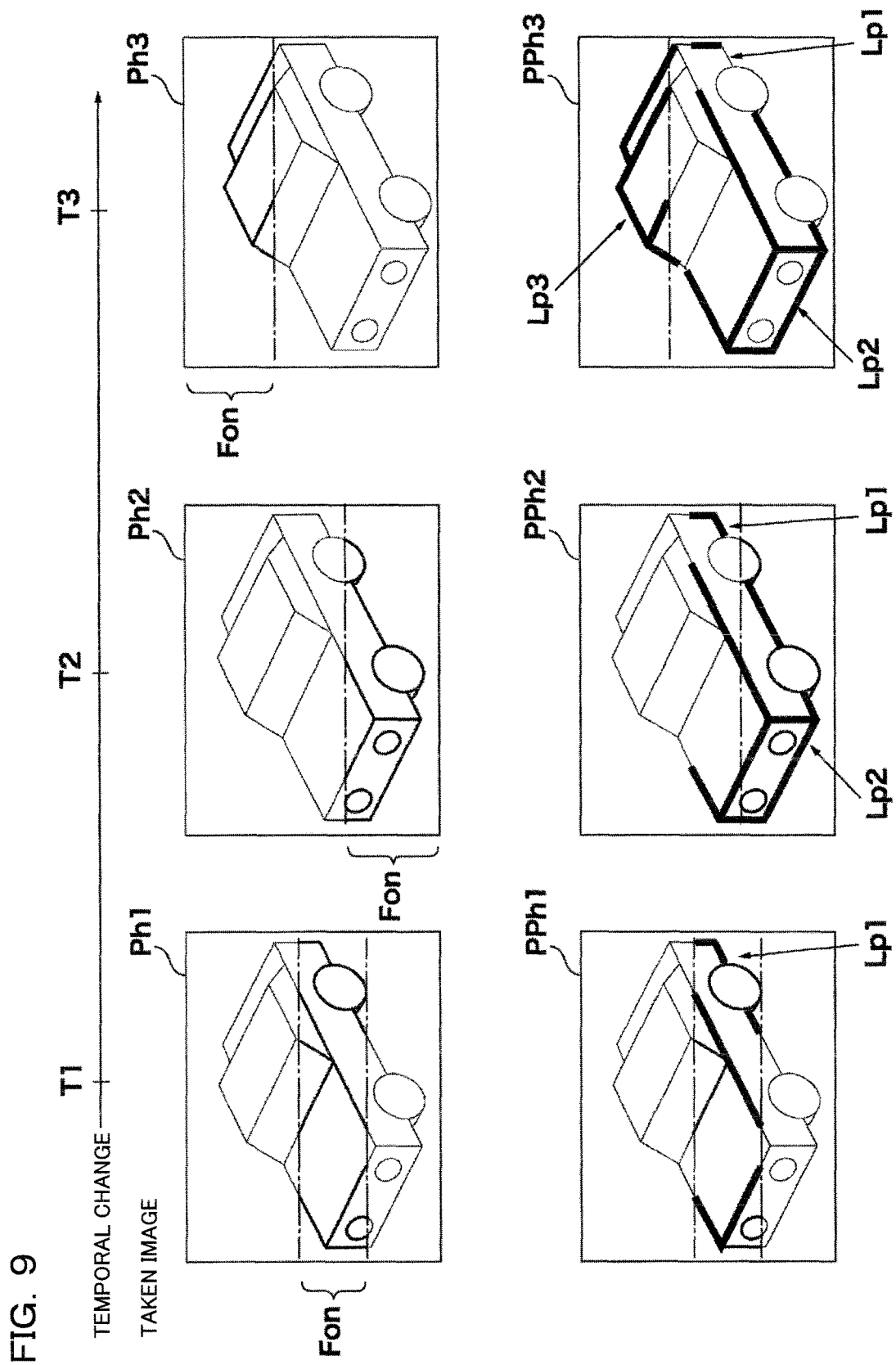
FIG. 9 is a view illustrating a generation process of an image to which highlight processing is applied in the camera according to the embodiment of the present invention.

Moreover, when a focus stacking mode is set during live-view display, a focus position of a photographing lens is sequentially moved, and each time the image data is obtained for focus stacking, the highlight processing is applied, and the image to which the highlight processing was applied is superimposed on the live-view image and displayed (see S35 in FIG. 4, S63 to S77 in FIG. 5, and FIG. 9).

Figure 1:
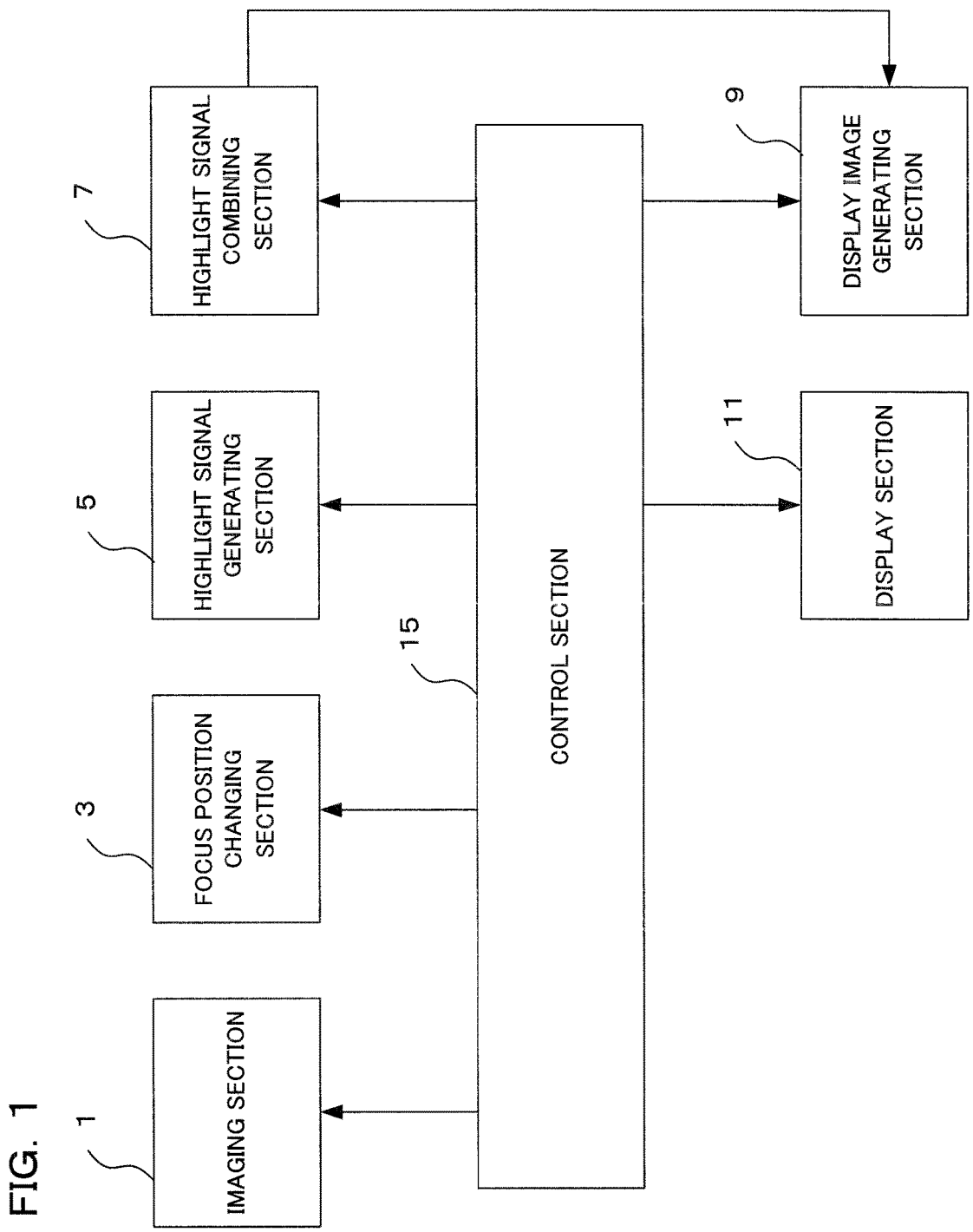
FIG. 1 is a block diagram mainly illustrating an electrical configuration of a camera according to an embodiment of the present invention.

FIG. 1 is a block diagram illustrating an outline of a camera according to the embodiment of the present invention and mainly illustrating an electrical configuration. An imaging section 1 has the photographing lens and an image sensor and photoelectrically converts the subject image and outputs image data. This imaging section 1 functions as an image sensor which captures a subject image to obtain the image data.

A focus position changing section 3 has a driver, such as a motor for driving the photographing lens and a motor driving circuit, and moves a focus position of a focus lens (focusing lens) in the photographing lens. This focus position changing section 3 functions as a focus position changing driver for moving a focus position of the focusing lens. This focus position changing driver changes control of focus position movement between a case of the live-view display and a case of a still-image photographing (see FIG. 7, for example).

Figures 7, 8:
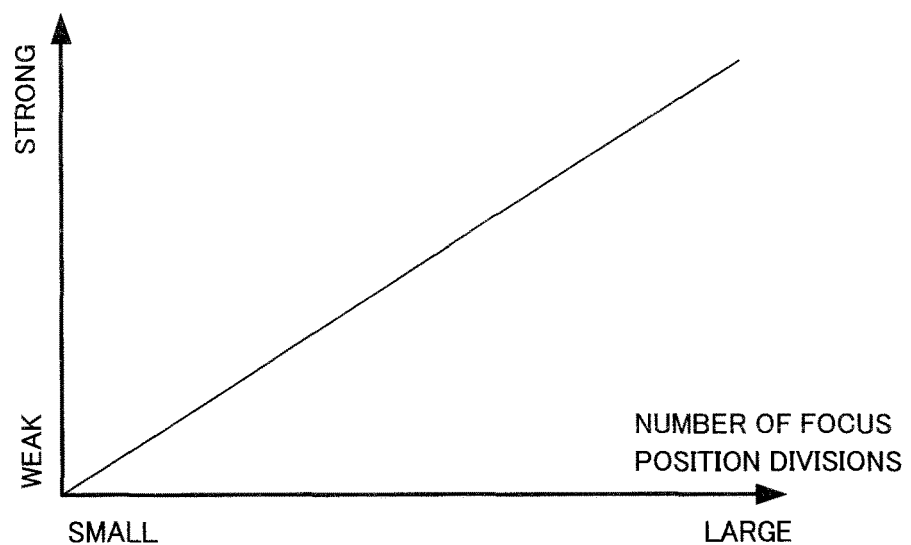
FIG. 7 is a view illustrating an order of movement of a focus position in the camera according to the embodiment of the present invention.
FIG. 8 is a graph illustrating a relationship between a focus position division number and highlight intensity in the camera according to the embodiment of the present invention.

Moreover, the focus position changing driver performs control so as to obtain images from an image at a focus position of either of an infinite-distance side far from and a closest-distance side to a focus position at a center in a range of moving the focusing position of the focusing lens in the case of the live-view display (see LV1 and LV2 in FIG. 7, for example). Moreover, in the case of the live-view display, the focus position changing driver widens an interval of the focus positions with respect to the case of the still-image photographing. In the case of an imaging apparatus with a fixed focus position, that is, in the case not including a focusing lens for changing a focus position like a digital microscope, for example, a distance between the photographing lens and a subject is adjusted by vertically moving a stage on which the subject is fixed so as to move the focusing position.

A highlight signal generating section 5 has a highlight signal generation circuit, applies the highlight processing to the image data obtained by the imaging section 1 to generate a highlight signal. Each time the focus lens is moved by the focus position changing section 3, the image data is obtained, and when this image data is obtained, the highlight signal generating section 5 performs the highlight processing. Therefore, the highlight signals corresponding to the respective focus positions are generated. The highlight signal is generated by detecting and amplifying a high frequency component (edge) of the image data. The highlight signal generating section 5 functions as a highlight signal generation circuit for generating the highlight signal from the obtained image data.

A highlight signal combining section 7 has a highlight signal combining circuit and combines the highlight signals generated by the highlight signal generating section 5. As described above, since the highlight signals corresponding to the respective focus positions are generated, a plurality of the highlight signals is combined. The combined highlight signal is a signal to which an edge at each focus position is added and corresponds to a focused portion at each focus position. The highlight signal combining section 7 functions as a highlight signal combining circuit for combining a plurality of the highlight signals to generate a combined highlight signal.

A display image generating section 9 has a display image generation circuit and generates an image on which the combined highlight signal combined by the highlight signal combining section 7 is superimposed on the image data obtained by the imaging section 1. That is, the display image generating section 9 superimposes the image based on the combined highlight signal based on the highlight signals at a plurality of focus positions on a latest live-view image. This superimposed image indicates a focused portion in an image generated by the focus stacking. The display image generating section 9 functions as the display image generation circuit for generating the display image data by superimposing the combined highlight signal on the image data.

A display section 11 has a liquid crystal panel, an organic EL panel, or the like, provided on an exterior part of a camera body and displays an image, such as a live-view image. This display section 11 can also display a live-view image in which the image based on the combined highlight signal generated by the display image generating section 9 is superimposed. Note that the display section 11 may be a type of observing through an ocular part such as an electronic view finder (EVF) other than the exterior part of the camera body. The display section 11 functions as a display displaying the display image.

A control section 15 has a CPU (Central Processing Unit), a peripheral circuit thereof, a memory and the like. The control section 15 is connected to the aforementioned imaging section 1, the focus position changing section 3, the highlight signal generating section 5, the highlight signal combining section 7, the display image generating section 9, and the display section 11. The CPU of the control section 15 performs entire control of the camera by controlling each part in accordance with a program stored in the memory.

Moreover, the control section 15 functions as a controller for giving instructions to cause the focus position changing section to move the focusing lens to a different focus position and the image sensor to obtain first image data and second image data, to cause the highlight signal generation circuit to generate a first highlight signal and a second highlight signal from the first image data and the second image data, to cause the highlight signal combining circuit to combine the first highlight signal and the second highlight signal to generate the combined highlight signal, and to cause the display image generation circuit to superimpose the combined highlight signal on the second image data to generate the display image data. This controller gives an instruction to cause the display to display the display image generated by the display image generation circuit.

Moreover, the aforementioned controller repeatedly gives instructions to cause the focus position changing section to move the focusing lens to a first focus position (S65 in FIG. 5, for example), the image sensor to obtain the first image (S67 in FIG. 5, for example), and the highlight signal generation circuit to generate the first highlight signal (S71 in FIG. 5, for example), to cause the focus position changing section to move the focusing lens to a second focus position different from the first focus position (S65 in FIG. 5 after return, for example), the image sensor to obtain the second image (S67 in FIG. 5 after return, for example), and the highlight signal generation circuit to generate the second highlight signal (S71 after return, for example), to cause the highlight signal combining circuit to combine the first highlight signal and the second highlight signal to generate the combined highlight signal (S75 in FIG. 5 after return, for example), and to cause the display image generation circuit to display the display image generated by superimposing the combined highlight signal on the second image on the display (S35 in FIG. 4, for example).

Figure 2:
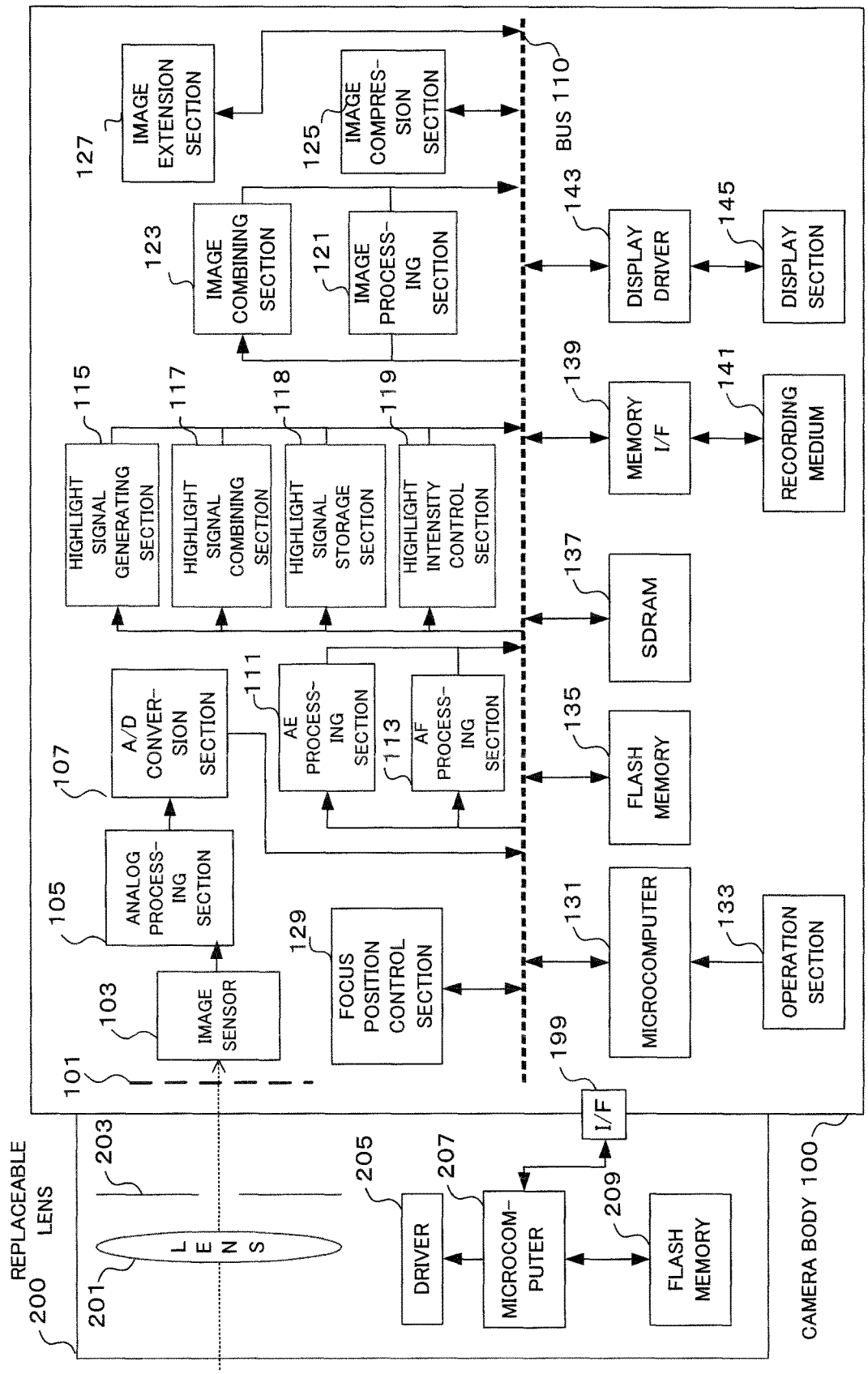
FIG. 2 is a block diagram illustrating a more detailed electrical configuration of the camera according to the embodiment of the present invention.

Subsequently, by using FIG. 2, detail of the electrical configuration of the camera according to the present embodiment will be described. This camera is constituted by a camera body 100 and a replaceable lens 200 detachably attached thereto. Note that, in the present embodiment, the photographing lens is of a replacement type, but this is not limiting, and it may naturally be a digital camera of a type in which the photographing lens is fixed to the camera body.

The replaceable lens 200 is constituted by a photographing lens 201, a diaphragm 203, a driver 205, a microcomputer 207, and a flash memory 209 and has an interface (hereinafter, referred to as an I/F) 199 between that and the camera body 100 which will be described later.

The photographing lens 201 is constituted by a plurality of optical lenses (including a focus lens (focusing lens) for focus adjustment) for forming a subject image and is a single-focus lens or a zoom lens. On a rear of an optical axis of this photographing lens 201, the diaphragm 203 is arranged, and the diaphragm 203 has a variable opening diameter so as to control a light amount of a subject light flux having passed through the photographing lens 201.

Moreover, the photographing lens 201 is constituted capable of moving in an optical axis direction by the driver 205, and a focus position is controlled by moving the focus lens in the photographing lens 201 on the basis of a control signal from the microcomputer 207, and in the case of the zoom lens, a focus distance is also controlled. The driver 205 has a motor, a motor driving circuit and the like for moving the photographing lens 201. The driver 205 has a function of the focus position changing section 3 in FIG. 1. Moreover, the driver 205 also controls the opening diameter of the diaphragm 203. The photographing lens 201, the driver 205, and a focus position control section 129 correspond to the focus position changing section 3 in FIG. 1.

The microcomputer 207 connected to the driver 205 is connected to the I/F 199 and the flash memory 209. The microcomputer 207 is operated in accordance with a program stored in the flash memory 209, communicates with a microcomputer 131 in the camera body 100 which will be described later, and controls the replaceable lens 200 on the basis of a control signal from the microcomputer 131.

The microcomputer 207 obtains a focus position of the focus lens from a focus position detecting section (not shown) and obtains a zoom position of the zoom lens from a zoom position detecting section (not shown). The obtained focus position and zoom position are transmitted to the microcomputer 131 in the camera body 100.

The flash memory 209 stores various types of information such as optical characteristics and adjustment values of the replaceable lens 200 other than the aforementioned programs. The microcomputer 207 transmits these various types of information to the microcomputer 131 in the camera body 100. The I/F 199 is an interface for conducting communication between the microcomputer 207 in the replaceable lens 200 and the microcomputer 131 in the camera body 100.

In the camera body 100 and on the optical axis of the photographing lens 201, a mechanical shutter 101 is arranged. This mechanical shutter 101 controls passage time of the subject light flux, and a known focal plane shutter or the like is employed. On the rear of this mechanical shutter 101 and at a position where the subject image is formed by the photographing lens 201, the image sensor 103 is arranged.

In the image sensor 103, photodiodes constituting each of pixels are arranged in a matrix manner two-dimensionally, and each photodiode generates a photoelectric conversion current according to a light receiving amount, and this photoelectric conversion current is charge-accumulated by a capacitor connected to each of the photodiodes. On a front surface of each pixel, an RGB filter of a Bayer array is arranged. Moreover, the image sensor 103 has an electronic shutter. The electronic shutter controls exposure time by controlling time from charge accumulation to charge readout of the image sensor 103. Note that, the image sensor 103 is not limited to the Bayer array but may naturally be of a lamination form such as Foveon (registered trademark), for example. The image sensor 103 corresponds to the imaging section in FIG. 1.

The image sensor 103 is connected to an analog processing section 105, and this analog processing section 105 has an analog processing circuit and applies waveform shaping to a photoelectric conversion signal (analog image signal) read out from the image sensor 103 after reduction of a reset noise or the like and moreover, applies gain-up so as to obtain appropriate brightness.

The analog processing section 105 is connected to an A/D conversion section 107, and this A/D conversion section 107 has an A/D conversion circuit, performs analog-digital conversion of the analog image signal and outputs the digital image signal (hereinafter, referred to as image data) to a bus 110. Note that, in this Description, the image data before being subjected to image processing at an image processing section 121 is called RAW data.

The bus 110 is a transfer path for transferring various types of data read out or generated inside the camera body 100 into the camera body 100. To the bus 110, other than the aforementioned A/D conversion section 107, an AE (Auto Exposure) processing section 111, an AF (Auto Focus) processing section 113, a highlight signal generating section 115, a highlight signal combining section 117, a highlight signal storage section 118, a highlight intensity control section 119, the image processing section 121, an image combining section 123, an image compression section 125, an image extension section 127, the microcomputer 131, a flash memory 135, an SDRAM 137, a memory interface (hereinafter, referred to as a memory I/F) 139, and a display driver 143 are connected.

The AE processing section 111 has an AE processing circuit, measures subject brightness on the basis of the image data input through the bus 110 and outputs this subject brightness information to the microcomputer 131 through the bus 110. An exclusive light measuring sensor for measuring the subject brightness may be provided, but in the present embodiment, the subject brightness is calculated on the basis of the image data.

The AF processing section 113 has an AF processing circuit, extracts a signal of a high frequency component from the image data, obtains a focusing evaluation value by integration processing, and outputs it to the microcomputer 131 through the bus 110. In the present embodiment, focusing of the photographing lens 201 is performed by a so-called contrast method. In this embodiment, AF control by the contrast method is described as an example, but it may be so configured that the subject light flux is divided, a phase difference sensor is provided on its optical path or a phase difference sensor is provided on the image sensor, and focusing is performed by the AF control by phase difference AF.

The highlight signal generating section 115 has a highlight signal generation circuit and generates a highlight signal on the basis of the image data from the image sensor 103. The highlight signal generating section 115 generates the highlight signal by detecting and amplifying a high frequency component (edge) of the image data. The highlight signal generated by the highlight signal generating section 115 is stored in the highlight signal storage section 118. The highlight signal generating section 115 corresponds to the highlight signal generating section 5 in FIG. 1.

The highlight signal storage section 118 has a volatile memory which is electrically rewritable or a non-volatile memory which is electrically rewriteable, and the SDRAM 137 which will be described later may also serve a function of the highlight signal storage section 118. The highlight signal storage section 118 stores the highlight signal generated by the highlight signal generating section 115 when a first photo of focus stacking is to be taken. For the second photo and after, the highlight signal combined by the highlight signal combining section 117 is stored (see S79 in FIG. 5).

Moreover, the highlight signal storage section 118 stores the highlight signal generated by the highlight signal generating section 115 or the highlight signal after combining generated by the highlight signal combining section 117 only when a predetermined condition is satisfied, while if the predetermined condition is not satisfied, the highlight signal is deleted. The predetermined condition will be described later by using a flowchart illustrated in FIG. 6.

The highlight signal storage section 118 functions as a highlight signal memory for storing the highlight signal. The highlight signal memory stores the highlight signal when all the values of a camera-shake amount, a movement amount, a focus distance, and a diaphragm value of the subject on an imaging surface are less than threshold values set in advance, while if at least one of the values of the camera-shake amount, the movement amount, the focus distance, and the diaphragm value of the subject on the imaging surface fluctuates not less than a threshold value set in advance, the highlight signal is not recorded (see S79 in FIG. 5 and FIG. 6).

The highlight signal combining section 117 has a highlight signal combining circuit, reads out the highlight signal stored in the highlight signal storage section 118 and combines this read-out highlight signal and the highlight signal generated in the highlight signal generating section 115. Therefore, the image data is read out from the image sensor 103, and each time the highlight signal is generated by the highlight signal generating section 115, the highlight signal is updated. The highlight signal combining section 117 performs so-called simple addition combination and thus, each time combination is repeated, combined image data in which an edge portion in each image data remains is generated. The highlight signal combining section 117 corresponds to the highlight signal combining section 7 in FIG. 1.

The highlight intensity control section 119 has a highlight intensity control circuit and changes a look of the highlight by changing an intensity degree of the detected edge. The intensity degree of the edge may be changed when it is generated by the highlight signal generating section 115 or may be changed when it is combined by the highlight signal combining section 117. Moreover, as a way of expressing the intensity degree of the edge, a thickness of the edge, transparency of the edge, a color of the edge and the like may be changed or the line is not limited to a solid line, but a line type may be changed to a broken line, a dotted line, a one-dot chain line, a two-dot chain line and the like. In any case, the change may be a change of an attribute such as a line expressing the edge that shows the intensity of the highlight signal.

The highlight intensity control section 119 functions as a highlight intensity changing circuit for changing intensity of the highlight signal. This highlight intensity control section may change the intensity of the highlight signal in accordance with an interval between a plurality of the focus positions (see FIG. 8, for example). The wider the interval between a plurality of the focus positions is, the more the highlight intensity changing section may increase the intensity of the highlight signal (see FIG. 8, for example).

The image processing section 121 has an image processing circuit and performs, on the RAW data from the image sensor 103, optical black (OB) subtraction processing, white balance (WB) correction, synchronization processing in the case of Bayer data, color reproduction processing, gamma correction processing, color matrix calculation, noise reduction (NR) processing, edge reinforcement processing and the like. In the case of taking a single photo, when a special effect and the like such as focus stacking is not set, the image processing is completed only by the processing by this image processing section 121.

The image combining section 123 has an image combining circuit and performs various image combining in accordance with the set combining mode and the like. The image combining section 123 performs combining of the image data by using the plurality of image data obtained in different states such as a focus position. In the present embodiment, the combining mode such as focus stacking for deepening the depth of a subject field can be set. When the focus stacking mode is set, the image combining section 123 performs alignment for the plurality of image data taken at a plurality of focus positions, extracts a region with high contrast in an image and generates the image data with a depth of field deeper than single taking by combining the regions with high contrast.

Moreover, the image combining section 123 generates image data in which the image data based on the highlight signal combined by the highlight signal combining section 117 is superimposed on the image data of the live-view image from the image sensor 103. This image data is displayed on a display section 145 through the display driver 143 during the live-view display (see S15 in FIG. 3 and FIG. 9, for example). The image combining section 123 corresponds to the display image generating section 9 in FIG. 1.

The image compression section 125 has an image compression circuit and compresses the image data read out from the SDRAM 137 in accordance with various compression methods, such as a JPEG compression method in the case of a still image or an MPEG in the case of a moving image, at the time of recording the image data in a recording medium 141.

Moreover, the image extension section 127 has an image compression circuit and also extends JPEG image data or MPEG image data for image reproduction display. In extension, a file recorded in the recording medium 141 is read out and after the extension processing is applied in the image extension section, the extended image data is temporarily stored in the SDRAM 137.

Note that, in the present embodiment, the JPEG compression method and the MPEG compression method are employed as the image compression method, but the compression method is not limited to them, and it is needless to say that other compression methods, such as TIFF and H.264, may be also used. Moreover, the compression method may be lossless compression or lossy compression.

The focus position control section 129 determines a focus position of subsequent photographing for taking a photo at a different focus position. The determined information is transmitted to the microcomputer 207 on a lens side, and the driver 205 of the lens 201 changes the focus position. Note that, the focus position control section 129 may realize the function by the CPU in the microcomputer 131.

The microcomputer 131 has a CPU (Central Processing Unit), a peripheral circuit thereof, a memory and the like. The microcomputer plays a function as a control section of this camera as a whole and integrally controls various sequences of the camera in accordance with the program stored in the flash memory 135. To the microcomputer 131, an operation section 133 is connected other than the aforementioned I/F 199.

The operation section 133 has operation members, such as a power button, a release button, a moving image button, a reproduction button, a menu button, a cross key, an OK button, various input buttons, and various input keys, detects operation states of these operation members, and outputs a detection result to the microcomputer 131. The microcomputer 131 performs various sequences according to a user's operation on the basis of the detection result of the operation member from the operation section 133. The power button is an operation member for instructing on/off of power of the digital camera. When the power button is pressed, the digital camera is powered on, and when the power button is pressed again, the digital camera is powered off.

The release button is constituted by a first release switch which is turned on by half-pressing and a second release switch which is turned on by further pressing from the half-pressing to full-pressing. The microcomputer 131 performs a photographing preparation sequence, such as an AE operation and an AF operation, when the first release switch is turned on. Moreover, when the second release switch is turned on, the microcomputer 131 executes a series of photographing sequence in which the mechanical shutter 101 and the like are controlled, the image data based on the subject image is obtained from the image sensor 103 and the like, and this image data is recorded in the recording medium 141, and performs photographing.

The moving image button is an operation button for instructing start and end of moving image photographing, and when the moving image button is operated first, the moving image photographing is started, and when it is operated again, the moving image photographing is finished. The reproduction button is an operation button for setting and releasing the reproduction mode, and when the reproduction mode is set, the image data of the taken image is read out from the recording medium 141, and the taken image is reproduced/displayed on the display panel 145.

The menu button is an operation button for having a menu screen displayed on the display panel 145. On the menu screen, various camera settings can be made. The camera setting has a combining mode, such as focus stacking, for example, and as the combining mode, modes such as HDR combining and super-resolution combining, may be included other than the above. Moreover, in the focus stacking mode setting, a depth of field adjustment mode for checking a focused range by applying the highlight processing can be also set.

The operation section 133 functions as an operation member for detecting an operation state of a display instructing member for instructing a camera operation by the photographer. When this operation member detects the operation state, an image in which the combined highlight signal is superimposed is live-view displayed on the display section (see FIGS. 3 and 4, for example). The operation section 133 includes a power switch instructing start and end of the operation, a photographing preparation switch for instructing so-called photographing preparation to start focusing adjustment, proper exposure amount adjustment, adjustment of image processing and the like, and a photographing instruction switch for instructing photographing.

A switch for instructing the photographing preparation specific to the camera and the switch for instructing start of the photographing are constituted by two-stage switches in many cases, and on a first stage (1st), a half-pressed state is brought about in which the photographing preparation instruction switch is turned on and on the second stage (2nd), the full-pressed state is brought about in which the photographing start instruction switch is turned on, but in other imaging apparatuses not including these switches, switches for separate instructions are provided and can be used instead. A part of the operation section 133 also includes a touch panel superimposed on the display panel of the display section 145. Moreover, when the operation section detects cancellation of the operation state, an image in which the highlight signal is not superimposed is displayed as a live-view image (see FIGS. 3 and 4, for example).

The flash memory 135 stores a program for executing various sequences of the microcomputer 131. The microcomputer 131 controls the entire camera on the basis of this program.

The SDRAM 137 is a volatile memory which is electrically rewritable for temporary storage of image data and the like. This SDRAM 137 temporarily stores the image data output from the A/D conversion section 107 and image data processed in the image processing section 121, the image combining section 123 and the like.

The memory I/F 139 is connected to the recording medium 141 and controls reading/writing of the image data and data such as a header attached to the image data with respect to the recording medium 141. The recording medium 141 is a recording medium, such as a memory card, detachably attached to the camera body 100, for example, but this is not limiting and it may be a hard disk or the like built in the camera body 100. The recording medium 141 functions as an image recording section for recording the combined image data.

The display driver 143 is connected to the display section 145 and has an image displayed on the display section 145 on the basis of the image data read out from the SDRAM 137 or the recording medium 141 and extended by the image extension section 127.

The display section 145 has a display panel and is arranged on a rear surface of the camera body 100 or the like and displays an image. In the display section 145, a display surface is arranged on an exterior part of the camera body, such as the rear surface, and thus it is a display section susceptible to an influence of external light but a large-sized display panel can be set. Note that, as the display section 145, various display panels, such as a liquid crystal display panel (LCD, TFT) and an organic EL, can be employed. Moreover, it may be a type of observing through an ocular part, such as an electronic view finder (EVF). The display section 145 corresponds to the display section 11 in FIG. 1.

Image display in the display section 145 includes rec-view display for displaying the recorded image data only for a short time immediately after the photographing, reproduction display of an image file, such as a still image and a moving picture, recorded in the recording medium 141, and moving-image display, such as live-view display. If the focus stacking mode is set in the live-view display, the image subjected to focus stacking is displayed, and moreover, if the depth of field adjustment mode is set, the image to which the highlight processing is applied is superimposed on the live-view image and displayed.

Subsequently, processing of the camera or particularly the focus stacking mode processing in the present embodiment will be described by using flowcharts illustrated in FIGS. 3 to 6. Note that, the flowcharts illustrated in FIGS. 3 to 6 (and similarly a flowchart illustrated in FIG. 10 which will be described later) are performed by the microcomputer 131 controlling each part in accordance with the program stored in the flash memory 135.

Figure 3:
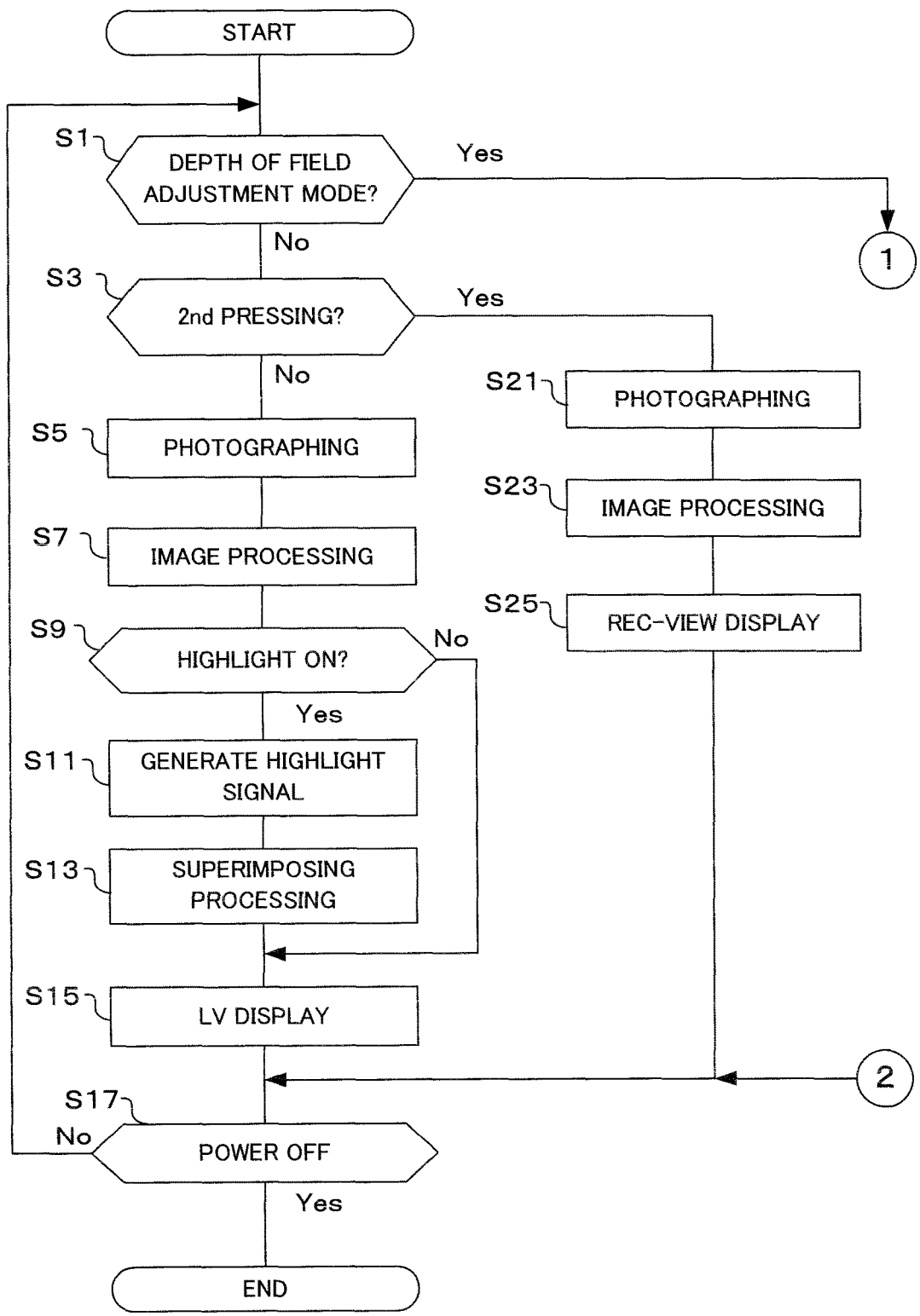
FIG. 3 is a flowchart illustrating an operation of focus stacking of the camera according to the embodiment of the present invention.

The flow illustrated in FIG. 3 starts the operation when the power switch is turned on by the user's operation of the operation section 133. Note that, the flow in FIG. 3 may be started not only when the power switch is turned on but at other timings such as half-pressing on the release button for instructing the photographing preparation of the camera, and a touch operation on the display section 145 involving the tough panel. Moreover, the flow in FIG. 3 may be stopped by the user's operation of the operation section 133.

When the flow illustrated in FIG. 3 is started, first, whether or not it is the depth of field adjustment mode (focus stacking mode) is determined (S1). The user can set the focus stacking mode on the menu screen. At this step, it is determined whether or not the focus stacking mode is set.

As the result of the determination at Step S1, when the depth of field adjustment mode is not set, it is determined whether the switch indicating photographing instruction has been turned on (2nd pressing or not) (S3). When the user performs full-scale photographing for still-image recording, the photographing instruction (release) button of the operation section 133 is fully pressed.

As the result of the determination at Step S3, if the switch indicating the photographing instruction is not on (2nd pressing), at Steps S5 to S15, the focus stacking processing is not performed but normal live-view display is made. First, photographing is performed (S5). In the photographing here, the image data for 1 frame is obtained for live-view display. Specifically, in a state where the shutter 101 is open, exposure is performed for a predetermined period of time by the electronic shutter of the image sensor 103 and after exposure time has elapsed, the image data is read out. For the exposure time, time calculated by the AE processing section 111 is used. In reading-out of the image data from the image sensor 103, thinning processing may be performed.

After photographing is performed at Step S5, then, the image processing is performed (S7). Here, basic image processing or the image processing for live-view display is applied to the image data obtained at Step S5 in the image processing section 121 and the like. As the basic image processing, general demosaicing, white balance correction, color matrix, gamma correction, edge reinforcement, noise reduction and the like are performed.

After the image processing is performed, then, it is determined whether or not the highlight is on (S9). The user can set the highlight processing on the menu screen or the like. At this step, it is determined whether or not this setting has been made. Note that, when the highlight is set to on, the highlight processing is applied to the image data, and an edge part with high contrast is highlighted on the display section 145 and thus, a focused range can be checked.

As the result of the determination at Step S9, if the highlight is on (set), the highlight signal is generated (S11). Here, by using the image data subjected to image processing at Step S7, the highlight signal generating section 115 generates a highlight signal. In the highlight signal generation, an edge of the image after the image processing is extracted and is subjected to highlight processing. Since the region with high contrast of the image is extracted also in the focus stacking, it can be made the similar processing. The processing of focus stacking may be simplified for highlight or a threshold value for extracting the region with high contrast may be changed. The image before the image processing may be used as long as the highlight signal can be generated, and a method other than edge extraction such as subject extraction may be used.

After the highlight signal is generated, then, superimposing processing is performed (S13). Here, the image data based on the highlight signal generated at Step S11 is superimposed on the image data for live-view display subjected to image processing at Step S7. The superimposing processing only needs to apply simple addition, for example, of the image data based on the highlight signal to the image data after the image processing.

After the superimposing processing is performed at Step S13 or as the result of the determination at Step S9, if the highlight is off, then, the live-view (LV) display is performed (S15). If the highlight is on (set), an image in which a part with high contrast is highlighted in the live-view image is displayed on the display section 145. On the other hand, if the highlight is off (unset), only the live-view image is displayed on the display section 145.

Returning to Step S3, as the result of the determination at this step, if the switch indicating the photographing instruction is on (2nd pressing), the full-scale photographing for still-image photographing is performed (S21). Here, the diaphragm value of the diaphragm 203 is controlled so as to be a diaphragm value calculated by the AE processing section 111. Further, after the shutter 101 is once closed, for the exposure time calculated by the AE processing section 111, the shutter 101 is opened and after the exposure time has elapsed, the shutter 101 is closed. After that, the image data is read out from the image sensor 103.

After the photographing is performed at Step S21, then, the image processing is performed (S23). Here, the image processing for recording is applied to the image data obtained at Step S21 by the image processing section 121 or the like, and the image compression section 125 applies the compression processing of the image data. The image data to which this compression processing is applied is recorded in the recording medium 141 through the memory I/F 139.

After the image processing is performed at Step S23, the rec-view display is made (S25). Here, by using the image data to which the image processing is applied at Step S23, the rec-view display is made for predetermined time on the display section 145. By means of this display, the user can check the image taken for recording. As the result of the check, if the photographing is not made as intended, the photographing can be made again.

Returning to Step S1, as the result of the determination at this step, if the depth of field adjustment mode (focus stacking mode) is set, then, it is determined whether or not the switch indicating the photographing instruction is on (2nd pressing or not) (S31). As described above, when the user is to perform the full-scale photographing for still-image recording, the user fully presses the release button of the operation section 133.

As the result of the determination at Step S31, if the switch indicating the photographing instruction is not on (2nd pressing), normal live-view display is made at Steps S33 and S35 and at the same time, the highlight processing is performed and superimposing display is made. First, live-view display image generation is performed (S33). If the highlight is off, the normal live-view display is made.

On the other hand, if the highlight is set, the focus lens is moved to the focus position determined in advance, and the image data is obtained at that position. Then, it is moved to the subsequent focus position, and the image data is obtained at that position. By repeatedly performing focus lens movement and obtainment of the image data, a plurality of pieces of the image data is obtained. Each time the image data is obtained at the focus position determined in advance, the highlight processing is performed, and the highlight signal is obtained. Moreover, the highlight signals obtained so far are combined, and the image data based on the combined highlight signal is superimposed on the image data obtained for the live-view display, and the image data based on the superimposing processing is generated. A detailed operation of this live-view display image generation will be described later by using FIG. 5.

At Step S33, after the live-view display image generation is performed, then, the live-view display is made (S35). At Step S33, since the image data is obtained at the focus position determined in advance for the focus stacking, each time the image data is obtained, the live-view display is made on the display section 145. Moreover, in the live-view display image generation at Step S33, if the highlight is on, the highlight-processed image is also superimposed, and the live-view display is made.

Returning to Step S31, as the result of the determination at this step, if the switch indicating the photographing instruction is on (2nd pressing), photographing and combining processing and the like for the focus stacking are performed at Step 41 and after. First, repetition of N times is set (S41), and the focus position is moved (S43). Here, the focus lens is moved to the focus position determined in advance and stopped at that position.

After the focus position is moved, the photographing is performed (S45). Here, the image data is obtained at the moved position, and this image data is temporarily stored in the SDRAM 137. After the photographing is performed, it is determined whether or not repetition has been made N times (S47). As the result of this determination, if the repetition has not been made N times, the position is moved to the subsequent focus position, and the image data is obtained at that position and temporarily stored. By repeating the focus lens movement and the obtainment of the image data N times, N pieces of the image data are obtained.

After the repetition is made N times, then, the image processing is performed (S49). Here, the image processing section 121 applies the image processing to the N pieces of image data obtained and temporarily stored at Step S45. After the image processing is applied, then, image combining is performed (S51). Here, the image combining section 123 performs the focus stacking by using the N pieces of the image data. In this focus stacking, alignment is made for the N pieces of image data, a region with high contrast in the image is extracted, the extracted regions with high contrast are combined, and the image data of the combined image is generated. The image data of this generated combined image is recorded in the recording medium 141.

After the image combining is performed, then, the rec-view display is performed (S53). Here, the rec-view display is made for predetermined time on the display section 145 by using the image data subjected to the combining processing at Step S51. By means of this display, the user can check the depth-combined image for recording. As the result of check, if it is not the intended combined image, the photographing is made again.

After the rec-view display is made at Step S53, or after the live-view display is made at Step S35, or after the rec-view display is made at Step S25, or after the live-view display is made at Step S15, then, it is determined whether or not power is off (S17). Here, it is determined whether or not the power button was operated and the power was turned off. As the result of this determination, if the power is on, the routine returns to Step S1, and the aforementioned operation is performed. On the other hand, if the power is off, this flow is finished.

As described above, in this flow, if the focus stacking mode (depth of field adjustment mode) is not set and the release button is not fully pressed, the normal live-view display is made (S1->S3->S5->S7->S9No->S15). Moreover, if the highlight is set at this time, the live-view image in which the highlight is superimposed on the normal live-view display is displayed (S1->S3->S5->S7->S9Yes->S11->S13->S15).

Moreover, if the focus stacking mode (depth of field adjustment mode) is set and if the release button is not fully pressed, the live-view display is made (S1Yes->S31No->S33->S35). The live-view display at this time will be described later by using FIG. 5. If the focus stacking mode (depth of field adjustment mode) is set, and the release button is fully pressed, photographing is performed sequentially at the focus positions determined in advance, the focus stacking processing is applied by using the plurality of pieces of image data obtained by this photographing and displayed (S1Yes->S31Yes->S41 to S53).

Note that this flowchart can be applied also to the still-image photographing. However, the still-image photographing may be disabled, and in that case, S3, S21 to S25, S31, and S41 to S43 only need to be omitted. Moreover, instead of the still-image photographing or in addition to the still-image photographing, the moving-picture taking may be enabled.

Subsequently, a detailed operation of the live-view display image generation (S33 in FIG. 4) will be described by using a flowchart illustrated in FIG. 5.

When the routine enters the flow of the live-view display image generation, first, similarly to Step 9, it is determined whether or not the highlight is on (set) (S61). As the result of this determination, if the highlight is on, then, it is determined whether or not focus position movement has been finished (S63). In the case of the focus stacking mode, the focus position of the focus lens performing photographing is determined in advance manually or automatically. At this step, it is determined whether or not the position has been moved to the focus position determined in advance.

As the result of the determination at Step S63, if the position has not been moved to the focus position, the focus position movement is performed (S65). Here, the focus lens is moved in accordance with a determined order to positions determined in advance. The focus positions and the order of the movement will be described later by using FIG. 7.

After the position is moved to the focus position at Step S65, photographing is performed (S67). In the photographing here, the image data for 1 frame is obtained for live-view display similarly to Step S5.

After the photographing is performed, then, the image processing is performed (S69). Here, similarly to Step S7, the image processing for live-view display is applied to the image data obtained at Step S67 by the image processing section 121 or the like.

After the image processing is performed, then, the highlight signal generation is performed (S71). Here, similarly to Step S11, the highlight signal generating section 115 generates the highlight signal by using the image data subjected to image processing at Step S69.

After the highlight signal is generated, then, the highlight signal is read (S73). The combined highlight signal is stored in the highlight signal storage section 118 at Step S79 which will be described later. At this step, this stored highlight signal is read out.

After the highlight signal is read, then, the highlight signals are combined (S75). Here, the highlight signal generated at Step S73 and the combined signal read out at Step S73 are combined. The combining is performed only by simple addition of the both signals. Note that, in the first photographing after the focus stacking is started, the highlight signal combining is not performed but the highlight signal generated on the basis of the image data obtained at the first photographing is stored in the highlight signal storage section 118 at Step S79.

After the highlight signal is combined, then, the superimposing processing is performed (S75). Here, the image data based on the highlight signal combined at Step S75 is superimposed on the image data for live-view obtained at Step S67. Here, on the basis of the generated image data, the live-view display is made at Step S35 (see FIG. 4). Note that, other than use of the latest image data obtained at Step S67 as the image data for superimposing each time, it may be so configured that the image data is obtained and stored at the focus position to be a basis at first, and this stored image is read out and used every time, for example.

Returning to Step S63, as the result of the determination at this step, if the focus position movement has been finished, photographing is performed similarly to Step S67 (S81). Here, the position has been moved to the focus position, and the highlight processing is not performed in duplication but the photographing is performed simply for live-view display. After the photographing is performed, the image processing is performed similarly to Step S69 (S83). Here, the image processing is performed to the image data obtained at Step S81.

After the image processing is performed, the highlight signal is read (S85). Here, the highlight signal generated at Step S71 and stored in the highlight signal storage section 118 is read out. After the highlight signal is read, the superimposing processing is performed (S87). Here, on the image data obtained at Step S81, the image data based on the highlight signal read out at Step S85 is superimposed.

After the superimposing processing is performed at Step S77 or S87, then, the highlight signal storage is performed (S79). The highlight signal combined at Step S75 is stored in the highlight signal storage section 118. Note that, in the case of the first photographing, the highlight signal generated at Step S71 is stored. If the subject moves largely or a handshake occurs or the like during the highlight processing or in the photographing with the focus position changed, the edge of the image extracted by the highlight processing becomes discontinuous. Thus, if the edge of the image enters a discontinuous state, the highlight signal stored in the highlight signal storage section 118 is deleted. A detailed operation of this highlight signal storage will be described later by using FIG. 6.

Returning to Step S61, as the result of the determination at this step, if the highlight is not on, the photographing is performed (S91). Since this is the case where the highlight is not set, processing of making the normal live-view display is performed at Steps S91 and S93. At Step S91, in the photographing here, the image data for 1 frame is obtained for live-view display.

After the photographing is performed, then, the image processing is performed (S93). Here, the basic image processing or the image processing for the live-view display is applied to the image data obtained at Step S91 by the image processing section 121 or the like.

After the image processing is performed at Step S93, or the highlight signal storage is performed at Step S79, the flow of the live-view display image generation is finished, and the routine returns to the original flow. The live-view display is made at Step S35 (FIG. 4) on the basis of the image data generated in this live-view display image generation flow.

As described above, in the flow of the live-view display image generation, at the first photographing, the focus lens is moved to the focus position determined in advance (S65), the photographing and the image processing are performed at this position (S67, S69), the highlight signal is generated on the basis of the image data generated here (S71), the highlight signal is superimposed on the image data (S77), and the highlight signal is stored (S79).

Moreover, at the second photographing and after, the focus lens is moved to the focus position determined in advance (S65), the photographing and the image processing are performed at this position (S67, S69), and the highlight signal is generated on the basis of the generated image data (S71). Then, the stored highlight signal is read out (S73), and this highlight signal and the highlight signal generated at Step S71 are combined. The superimposing processing of the combined highlight signal and the image data obtained at Step S67 is performed (S77), and this combined highlight signal is stored (S79). The live-view display is made on the basis of this image data subjected to the superimposing processing (S35 in FIG. 4).

Figure 6:
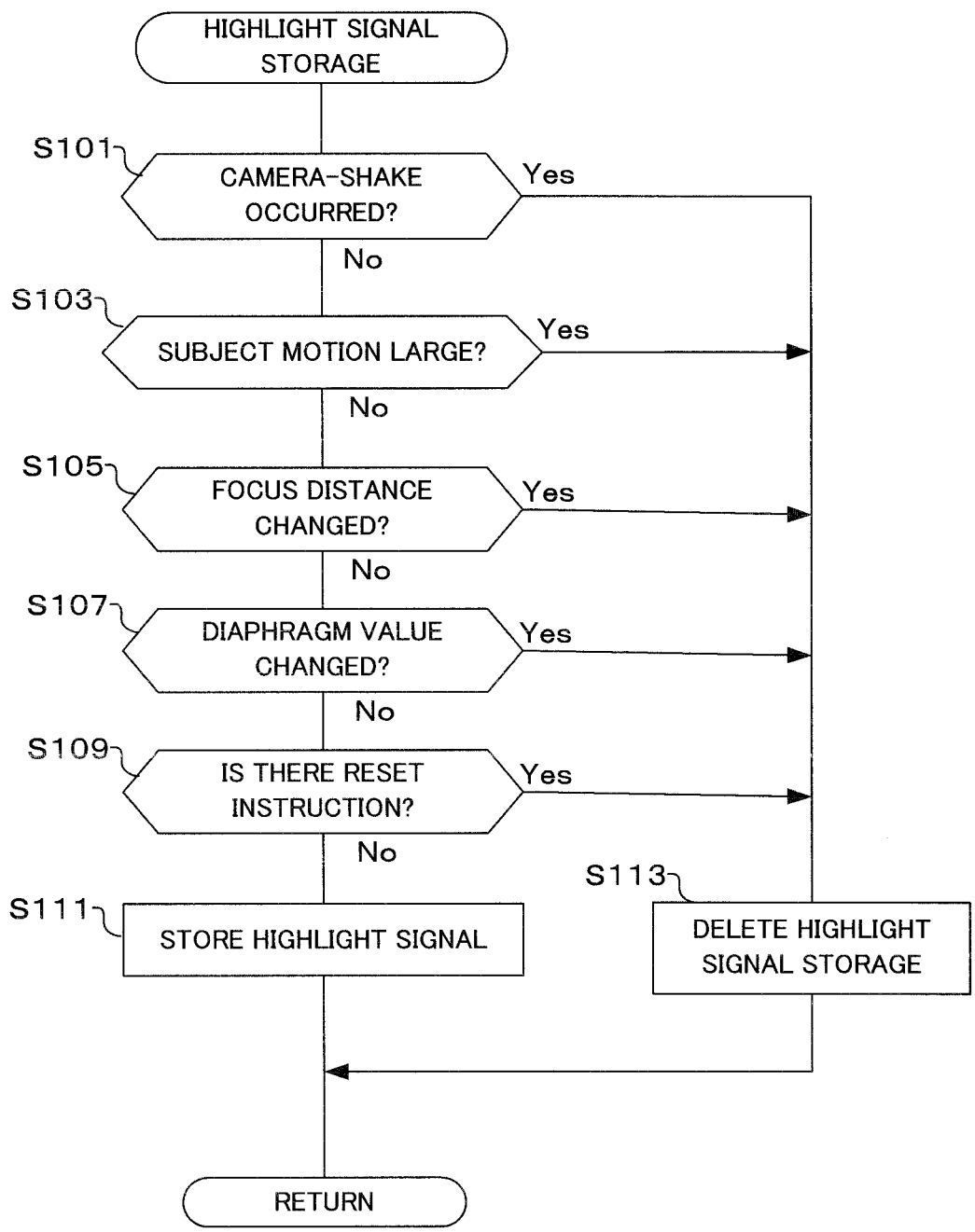
FIG. 6 is a flowchart illustrating an operation of highlight signal storage of the camera according to the embodiment of the present invention.

Subsequently, a detailed operation of the highlight signal storage (S79 in FIG. 5) will be described by using a flowchart illustrated in FIG. 6. Here, if the edge of the image enters a discontinuous state, the highlight signal stored in the highlight signal storage section 118 is deleted, while if the edge does not become discontinuous, the highlight signal is stored. Moreover, if the photographer intentionally finishes the highlight processing, the highlight signal is deleted.

When the routine enters the flow of the highlight signal storage, first, it is determined whether or not a handshake has occurred (S101). If a handshake sensor for detecting a motion applied to the camera body such as a gyro, an acceleration sensor, and an angle speed sensor is mounted on the camera body 100, determination is made on the basis of an output of this handshake sensor. Moreover, it may be so configured that the handshake is detected on the basis of the image data.

As the result of the determination at Step S101, if the handshake has not occurred, then, it is determined whether or not the motion of the subject is large (S103). Here, determination is made on the basis of whether or not a movement amount of the subject on the imaging surface fluctuates by a threshold value set in advance or more on the basis of the image data at present and predetermined time before.

As the result of the determination at Step S103, if the motion of the subject is not large, then, it is determined whether or not the focus distance has changed (S105). Here, information relating to the currently set focus distance from the replacement lens 200 is obtained, and it is determined whether or not the focus distance has fluctuated by a value determined in advance or more. That is because if the focus distance changes, a view angle changes, and the edge obtained by the highlight processing becomes discontinuous.

As the result of the determination at Step S105, if the focus distance has not changed, then, it is determined whether or not the diaphragm value has changed (S107). Here, information relating to the currently set diaphragm value is obtained from the replacement lens 200, and it is determined whether or not the diaphragm value has fluctuated by a value determined in advance or more. That is because if the diaphragm value changes, the depth of field changes. Note that the determination may be made on the basis of the diaphragm value instructed from the camera body 100 to the replacement lens 200. Moreover, if the diaphragm value changes in conjunction with the subject brightness, the determination may be made on the basis of the subject brightness.

As the result of the determination at Step S107, if the diaphragm value has not changed, then, it is determined whether or not there is a reset instruction (S109). This is performed when the photographer wants to finish the highlight processing. The reset instruction may be made to the camera body by photographer's predetermined operation. For example, the instruction is given by various operations such as pressing on the operation button (release button or the like), a touch operation on the touch panel, high-speed rotation of a focus ring, and movement of the focus position by a predetermined amount or more.

As the result of the determination at Step S109, if there is no reset instruction, the highlight signal is stored (S111). If any of conditions illustrated in Steps S101 to S109 is not applicable, the highlight signal which has been combined or read is stored in order to use the highlight signal in the subsequent live-view display image generation.

On the other hand, if the result of the determination at Steps S101 to S109 is Yes, the storage of the highlight signal storage is deleted (S113). In this case, any of the conditions in Steps S101 to S109 is applicable, and there is a change from a situation in which the stored highlight signal is generated and thus, the stored highlight signal is discarded.

As described above, in the flow of the highlight signal storage, the highlight signal is deleted if a predetermined condition for stop is met so that the highlight processing can be stopped. Moreover, if the predetermined condition for stop is not met, the highlight signal is stored so that the highlight processing can be continued.

Subsequently, focus position movement control at aforementioned Steps S43 (FIG. 4) and S65 (FIG. 5) will be described by using FIG. 7. In an example illustrated in FIG. 7, the number of photos to be taken for the focus stacking is 5, but the number of photos to be taken may be larger than 5 or may be smaller.

In FIG. 7, a position Lr is a reference focus position, a focus position center when the focus stacking is executed, and a focus position (subject distance) which is a combining center. Moreover, positions L1 to L4 are focus positions (subject distances) from the close side to the infinitely distant side. FIG. 7 illustrates two examples of a still image 1 and a still image 2 in the case of the still image as a photographing order. These examples are performed at Step S43 in FIG. 4.

A photo of the still image 1 is first taken at the reference focus position Lr and then, taken in the order of L2, L3, L1, and L4. In this method, a temporal change of the focus position closer to the reference focus position Lr can be reduced, and positioning in the focus stacking processing becomes easy, which is advantageous in view of an image quality. A photo of the still image 2 is taken sequentially in the order of L1, L2, Lr, L3, and L4 from the close side to the infinitely distant side. In this method, variation in a moving speed of the focus position movement and stop positions of the focus positions can be considered. Moreover, total moving time can be minimized.

Moreover, in FIG. 7, as an example of the photographing order in the case of the live-view (LV) display, two examples of LV1 and LV2 are illustrated. These examples are executed at Step S65 in FIG. 5. A photo of the LV1 is taken in order from the focus position which is the farthest from the reference focus position so that a depth expansion width can be checked earlier. After the photos are taken up to L3, it is only necessary to be held at the position of Lr. After the reset processing or after the photographing preparation instruction switch is turned on (1st release pressing), photographing is performed again from the beginning. Moreover, in the LV2, photos are taken only at three points, that is, at L1, Lr, and L4 so that the depth expansion width can be checked quickly.

Note that, in FIG. 7, the numbers of divisions are the same in the still-image photographing and in the live-view display. However, the number of photos to be taken may be decreased by making a focus position interval larger in the case of the live-view display than that in the case of the still image. That is, the focus position changing section 3 may widen the interval of the focus positions in the case of the live-view display with respect to the still-image storage. By decreasing the number of photos to be taken, the depth expansion width can be checked in a short time.

Subsequently, a relationship between the number of divisions of the focus position and intensity of the highlight will be described by using FIG. 8. When the image to which the highlight processing is applied is to be displayed on the display section 145, parameters of the highlight may be changed in accordance with the number of divisions of the focus position. In FIG. 8, a lateral axis indicates the number of divisions of the focus position, while a vertical axis indicates the intensity of the highlight.

When the number of divisions is increased, and the interval between the focus positions is made smaller, the intensity of the highlight is weakened. If the number of divisions is large, the highlight signal can be obtained widely in the screen and thus, if the intensity of the highlight is increased, the subject becomes hard to be seen. On the other hand, when the number of divisions is decreased (the interval between the focus positions is large), the intensity of the highlight is increased. When the number of divisions is small, the highlight signal can be obtained by a part of the image in many cases and thus, the intensity of the highlight is increased so that the highlight signal can be seen easily.

This change of the intensity of the highlight signal is made at the same time when the highlight intensity control section 119 performs the highlight signal generation at Step S71 (FIG. 5). That is, it is only necessary that the highlight intensity control section 119 changes the intensity of the highlight to the highlight signal generated at Step S71. As described above, the intensity of the highlight signal may be changed in accordance with the interval between the plurality of focus positions and moreover, the wider the interval of the plurality of focus positions is, the intensity of the highlight signal may be made the stronger.

Subsequently, examples of taken images and taken images with highlight signals in the present embodiment will be described by using FIG. 9. The examples illustrated in FIG. 9 are similar to the example of LV2 in FIG. 7, the number of photographing sessions is three times performed at times T1, T2, and T3, and the photos are taken at the focus positions in the order of Lr, L1, and L4.

A taken image Ph1 is an image taken at the time T1 and at the focus position Lr. It is focused within a range of Fon. Further, a taken image PPh1 with highlight signal is an image generated by executing the highlight processing at Steps S71 to S77 (FIG. 5) by using the image data of the taken image Ph1. By executing the highlight processing, an edge Lp1 of the image is also superimposed on the live-view image in display.

A taken image Ph2 is an image taken at the time T2 and at the focus position L1. It is focused within a range of Fon. Further, a taken image PPh2 with highlight signal is an image generated by executing the highlight processing at Steps S71 to S77 (FIG. 5) by using the image data of the taken image Ph2. Since the position is changed to the focus position L1, an edge Lp2 of the image is displayed. Moreover, since the highlight signals are combined in the highlight processing, the edge Lp2 is also displayed in addition to the edge Lp1 of the image. Therefore, the edges Lp1 and Lp2 of the image are superimposed on the live-view image in display.

The taken image Ph3 is an image taken at the time T3 and at the focus position L2. It is focused within a range of Fon. Further, a taken image PPh3 with highlight signal is an image generated by executing the highlight processing at Steps S71 to S77 (FIG. 5) by using the image data of the taken image Ph3. Since the position is changed to the focus position L2, an edge Lp3 of the image is displayed. Moreover, since the highlight signals are combined in the highlight processing, the edge Lp3 is also displayed in addition to the edges Lp1 and Lp2 of the image. Therefore, the edges Lp1, Lp2, and Lp3 of the image are superimposed on the live-view image in display. By checking the edges Lp1 to Lp3, a focused portion with high contrast is easily known.

As described above in the present embodiment, by executing the focus stacking mode and highlight setting in the live-view display, a focused range of the depth combined image generated by the focus stacking processing in the full-scale photographing (in 2nd pressing) can be forecasted. If the intended depth of field has not been obtained, it is only necessary to check on the live-view display again by changing various photographing conditions such as the focus position interval, the focus distance, and the diaphragm value.

Subsequently, a modification example of the control flow of the focus stacking of the present embodiment will be described by using a flowcharts illustrated in FIG. 10. In the flowchart illustrated in FIGS. 3 and 4 according to the embodiment of the present invention, after the processing is started by the user's operation of the operation section 133, the processing is repeatedly performed until the processing is stopped by the user's operation again of the operation section 133. On the other hand, in this modification example, the highlight processing is executed only during the half-pressing operation on the release button, and when the half-pressing is cancelled, the highlight processing is also cancelled.

This modification example is different in a point that Step S30 (FIG. 10) is added in FIGS. 3 and 4, while the other processing is the same as those in the flowcharts in FIGS. 3 and 4. Thus, mainly the difference will be described, the same step numbers are given to the steps executing the same processing, and detailed description will be omitted.

Figure 10:
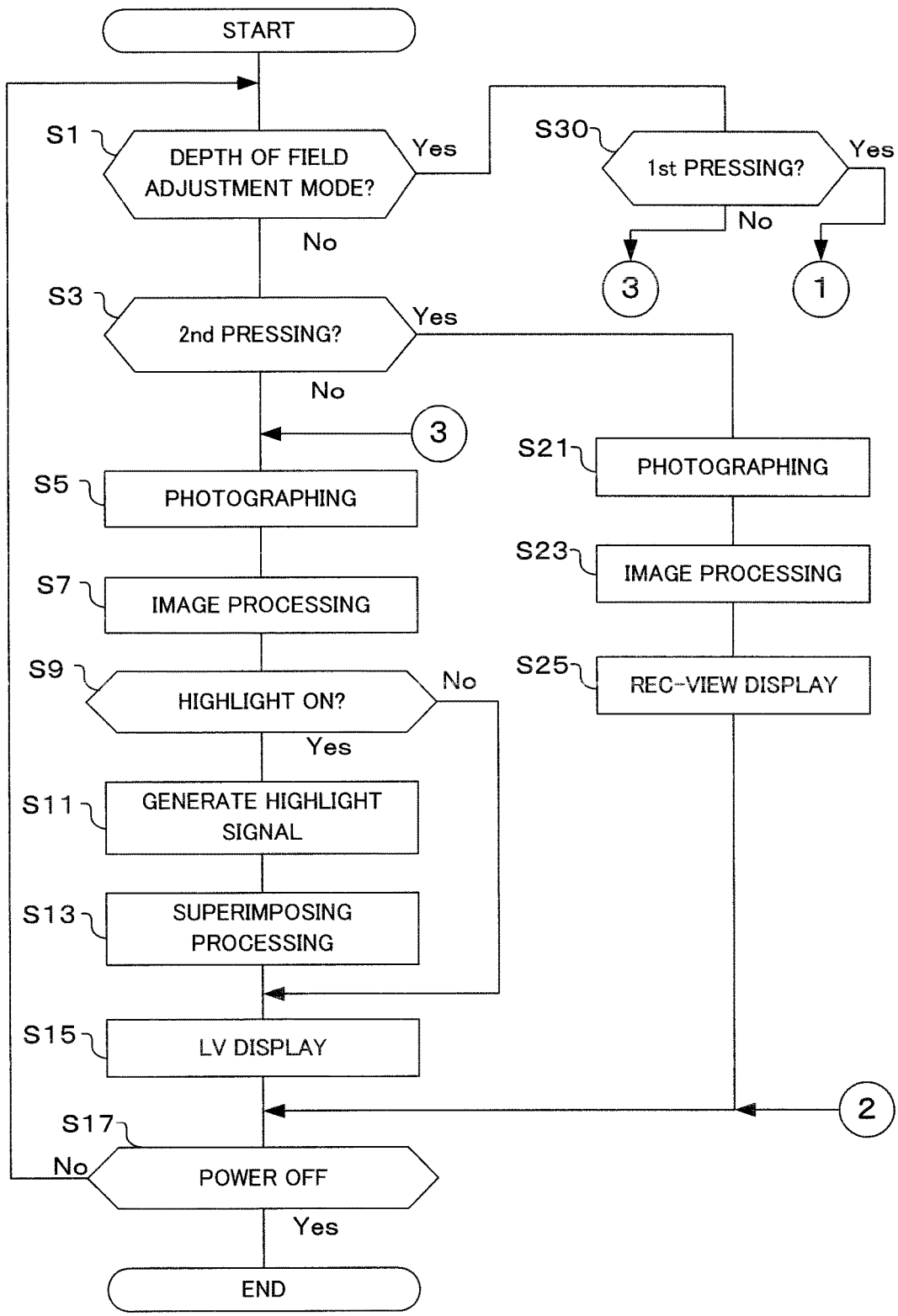
FIG. 10 is a flowchart illustrating an operation of a modification example of focus stacking of the camera according to the embodiment of the present invention.

When the routine enters the flow illustrated in FIG. 10, whether or not it is the focus stacking mode (depth of field adjustment mode) is determined (S1). AS the result of this determination, if the focus stacking mode is set, it is determined whether or not an operation to turn on the photographing preparation instruction switch (1st pressing, that is, half-pressing on the release button) has been made (S31).

As the result of the determination at Step S30, if the photographing preparation instruction switch is not on (1st pressing), the routine proceeds to Step S5, and the photographing is performed. The subsequent processing is the same as that illustrated in FIG. 3. On the other hand, if the photographing preparation instruction switch is on (1st pressing), the routine proceeds to Step S31 (FIG. 4), and it is determined whether or not the switch indicating the photographing instruction is on (2nd pressing). Therefore, if the photographing preparation instruction switch is on (1st pressing) and the switch indicating the photographing instruction is not on (2nd pressing), that is, only while the photographing preparation instruction (half-pressing on the release button) operation is continued, the live-view display with highlight signal in the focus stacking is performed at Steps S33 and S34. Moreover, if the half-pressing operation on the release button has been cancelled, the normal live-view display is made (S5, S15), and if the highlight is set, the live-view display with highlight signal is made each time a single shot is taken (S9Yes, S11 to S15).

Note that, in the flowchart illustrated in FIG. 10, the live-view display with highlight signal is made during the operation of the photographing preparation instruction (half-pressing on the release button). However, an operation member for instructing the live-view display with highlight signal is not limited to the release button but may be other operation members such as a function button, or a touch panel.

As described above, in this modification example, the operation section (the operation section 133, for example) for detecting the operation state of the display instructing member for the photographer to instruct the camera operation is provided, and when the operation section detects the operation state, an image on which the combined highlight signal is superimposed is live-view displayed on the display section (S30Yes in FIG. 10->S33 in FIG. 4, for example). Moreover, when the operation section detects cancellation of the operation state, an image on which the highlight signal is not superimposed is displayed as the live-view image (S30No in FIG. 10->S5, for example). Thus, the highlight processing can be performed only when the photographer needs it.

As described above, in the embodiment and the modification example of the present invention, instructions are given such that the focusing lens is moved to a different focus position by the focus position changing section (see S65 in FIG. 5, for example), the first image data and the second image data are obtained by the imaging section (see S67 in FIG. 5, for example), the first highlight signal and the second highlight signal are generated by the highlight signal generating section with respect to the first image data and the second image data (see S71 in FIG. 5, for example), the first highlight signal and the second highlight signal are combined by the highlight signal combining section so as to generate the combined highlight signal (see S75 in FIG. 5, for example), and the combined highlight signal is superimposed on the second image by the display image generating section and generated (see S77 in FIG. 5, for example).

Thus, the depth expansion effect can be checked at a high speed and easily. That is, in the embodiment and the modification example of the present invention, the highlight signal is generated each time the image data is obtained from the imaging section, and the highlight signals are combined each time the image data is obtained. Thus, as compared with a case of generation of the highlight signal after the focus stacking processing is performed, the processing can be performed in a short time, and the depth expansion effect can be easily checked.

Note that, in the embodiment and the modification example of the present invention, the AE processing section 111, the AF processing section 113, the highlight signal generating section 115, the highlight signal combining section 117, the highlight intensity control section 119, the image processing section 121, the image combining section 123, the focus position control section 129 and the like are configured separately from the microcomputer 131. However, this is not limiting, and it may be so configured that the whole of or a part of each of these sections is configured by software and realized by the CPU in the microcomputer 131. Moreover, the whole of or a part of each of the aforementioned sections may be configured by hardware such as a gate circuit generated on the basis of a program language described by Verilog or may use hardware configuration using software such as DSP (Digital Signal Processor). It is needless to say that they can be combined as appropriate. Moreover, the function realized in a software manner by the CPU in the microcomputer 131 may be configured to be realized by the hardware circuit, Verilog, DSP and the like.

Moreover, in the present embodiment, a digital camera was used in description as a device for taking a photo, but the camera may be a digital single-lens reflex camera, a mirrorless camera or a compact digital camera or may be a camera for a moving picture such as a video camera and a movie camera and moreover, it may be a camera built in a mobile phone, a smart phone, a portable information terminal, a personal computer (PC), a tablet-type computer, a game device and the like, a medical camera, a camera for scientific devices such as a microscope, an automobile-mounted camera or a monitoring camera. In any case, the present invention can be applied to any device as long as it performs highlight processing.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus comprising:
   a focus position changing driver for moving a focusing lens to a plurality of focus positions;
   an image sensor for capturing a subject image to obtain image data at each of the plurality of focus positions, thereby obtaining a plurality of image data;
   a highlight signal generation circuit for generating a highlight signal from each of the obtained plurality of image data, thereby generating a plurality of highlight signals;
   a highlight signal combining circuit for combining the plurality of the highlight signals to generate a combined highlight signal;
   a display image generation circuit for superimposing the combined highlight signal on one of the plurality of image data to generate display image data;
   a controller for giving instructions to cause the focus position changing driver to move the focusing lens to each of the plurality of focus positions, to cause the image sensor to obtain the plurality of image data, to cause the highlight signal generation circuit to generate the plurality of highlight signals from the plurality of image data, to cause the highlight signal combining circuit to combine the plurality of highlight signals to generate the combined highlight signal, and to cause the display image generation circuit to superimpose the combined highlight signal on the one of the plurality of image data to generate the display image data; and
   a highlight signal memory for storing a highlight signal, wherein
   the highlight signal memory stores a particular one of the plurality of highlight signals if all values of a camera-shake amount, a movement amount of a subject on an imaging surface, a focus distance, and a diaphragm value are less than corresponding threshold values set in advance, but does not record the particular one of the plurality of highlight signals if at least one value of the camera-shake amount, the movement amount of the subject on the imaging surface, the focus distance, and the diaphragm value equals or exceeds its corresponding threshold value set in advance.

2. The imaging apparatus according to claim 1, further comprising:
   a display for displaying a display image, wherein the controller gives an instruction to cause the display to display the display image generated by the display image generation circuit.

3. The imaging apparatus according to claim 2, wherein the controller repeatedly gives instructions to cause the display image generation circuit to display a display image generated by superimposing the combined highlight signal on the one of the plurality of image data on the display.

4. The imaging apparatus according to claim 2, further comprising:
   an operation button, key, or panel for detecting an operation state of a display instructing member for a photographer to instruct a camera operation, wherein when the operation button, key, or panel detects the operation state, an image on which the combined highlight signal is superimposed is live-view displayed on the display.

5. The imaging apparatus according to claim 4, wherein when the operation button, key, or panel detects cancellation of the operation state, an image on which the combined highlight signal is not superimposed is displayed as a live-view image.

6. The imaging apparatus according to claim 1, wherein the focus position changing driver changes control of focus position movement between a case of live-view display and a case of still-image photographing.

7. The imaging apparatus according to claim 6, wherein the focus position changing driver performs control so as to obtain images from the image sensor at a focus position of either of an infinite-distance side from and a closest-distance side to a focus position at a center in a range of moving the focusing position in the case of the live-view display.

8. The imaging apparatus according to claim 6, wherein the focus position changing driver widens an interval between adjacent ones of the plurality of focus positions in the case of the live-view display as compared with the case of the still-image photographing.

9. The imaging apparatus according to claim 8, further comprising:
a highlight intensity changing circuit for changing intensity of at least one of (A) each of the plurality of highlight signals, and (B) the combined highlight signal, wherein
the intensity of the at least one of (A) each of the plurality of highlight signals, and (B) the combined highlight signal is changed in accordance with an interval between the plurality of focus positions.

10. The imaging apparatus according to claim 9, wherein the wider the interval between the adjacent ones of the plurality of focus positions is, the more the highlight intensity changing circuit increases the intensity of the at least one of (A) each of the plurality of highlight signals, and (B) the combined highlight signal.

11. An imaging method in an imaging apparatus having an image sensor for capturing a subject image to obtain image data, comprising:
moving a focusing position to a first focus position so as to obtain first image data by the image sensor, and moving the focusing position to a second focus position so as to obtain second image data by the image sensor;
generating a first highlight signal by using the first image data, and generating a second highlight signal by using the second image data;
combining the first highlight signal and the second highlight signal to generate a combined highlight signal;
superimposing the combined highlight signal on the second image data;
determining whether (A) all values of a camera-shake amount, a movement amount of a subject on an imaging surface, a focus distance, and a diaphragm value are less than corresponding threshold values set in advance, or (B) if at least one value of the camera-shake amount, the movement amount of the subject on the imaging surface, the focus distance, and the diaphragm value equals or exceeds its corresponding threshold value set in advance; and
responsive to a determination that (A) all values of a camera-shake amount, a movement amount of a subject on an imaging surface, a focus distance, and a diaphragm value are less than corresponding threshold values set in advance, storing the highlight signal, and otherwise, responsive to a determination that (B) at least one value of the camera-shake amount, the movement amount of the subject on the imaging surface, the focus distance, and the diaphragm value equals or exceeds its corresponding threshold value set in advance, not storing the highlight signal.

12. A non-transitory computer-readable medium storing a computer program for causing a computer of an imaging apparatus having an image sensor for capturing a subject image to obtain image data to execute an imaging method, the imaging method comprising:
moving a focusing position to a first focus position so as to obtain first image data by the image sensor, and moving the focusing position to a second focus position so as to obtain second image data by the image sensor;
generating a first highlight signal by using the first image data, and generating a second highlight signal by using the second image data;
combining the first highlight signal and the second highlight signal to generate a combined highlight signal;
superimposing the combined highlight signal on the second image data;
determining whether (A) all values of a camera-shake amount, a movement amount of a subject on an imaging surface, a focus distance, and a diaphragm value are less than corresponding threshold values set in advance, or (B) if at least one value of the camera-shake amount, the movement amount of the subject on the imaging surface, the focus distance, and the diaphragm value equals or exceeds its corresponding threshold value set in advance; and
responsive to a determination that (A) all values of a camera-shake amount, a movement amount of a subject on an imaging surface, a focus distance, and a diaphragm value are less than corresponding threshold values set in advance, storing the highlight signal, and otherwise, responsive to a determination that (B) at least one value of the camera-shake amount, the movement amount of the subject on the imaging surface, the focus distance, and the diaphragm value equals or exceeds its corresponding threshold value set in advance, not storing the highlight signal.

* * * * *